July 3, 1956 L. DIVEN ET AL 2,753,455

FREQUENCY DIVIDER

Filed Nov. 7, 1952

INVENTORS
LISCUM DIVEN
RICHARD R. WAER

BY Percy P. Lantzy

ATTORNEY

United States Patent Office 2,753,455

Patented July 3, 1956

2,753,455

FREQUENCY DIVIDER

Liscum Diven, Phoenix, Ariz., and Richard R. Waer, Nutley, N. J., assignors to International Telephone and Telegraph Corporation, a corporation of Maryland Application November 7, 1952, Serial No. 319,306

10 Claims. (Cl. 250—36)

This invention relates to frequency division in electronic apparatus and more particularly to frequency dividers of exceptionally high stability.

Frequency division is the process of deriving from a frequency $f$ a frequency $f/n$, where $n$ is an integer greater than one. Frequency division is important in frequency measurement work as it provides a means whereby one may derive from a standard high frequency oscillation, low frequency oscillations of the same precision particularly useful in frequency modulation transmitters, television transmitters, and in other electronic systems. In pulse time multiplex systems particularly, pulses of various repetition rates are usually required for generation of the necessary timing waveforms, and these pulses can be obtained by use of frequency dividers.

There are different methods know in the art for producing frequency division, as for example, one based upon the use of base frequency oscillators, multivibrators, or other types of relaxation oscillators.

The above-mentioned methods, however, have the disadvantage that there is a tendency for the ratio of division to change if the circuit constants, electrode voltages, tube characteristics due to aging, or amplitude of synchronizing voltage vary appreciably, especially at pulse rates above 100 kc. Other frequency dividers using time delay circuits have been devised to overcome the above-mentioned difficulties.

An object of this invention is to provide an improved frequency divider using time delay circuits insuring a stability not achieved with other systems.

A feature of this invention is that not only are time delay circuits used in the frequency divider as the only frequency determining elements, they are also used in a non-critical manner. Thus, if T is the interval spacing of pulses to be divided, the delay may vary in many cases as much as $$\frac{T}{2}$$

without affecting the division ratio.

Figure 1:
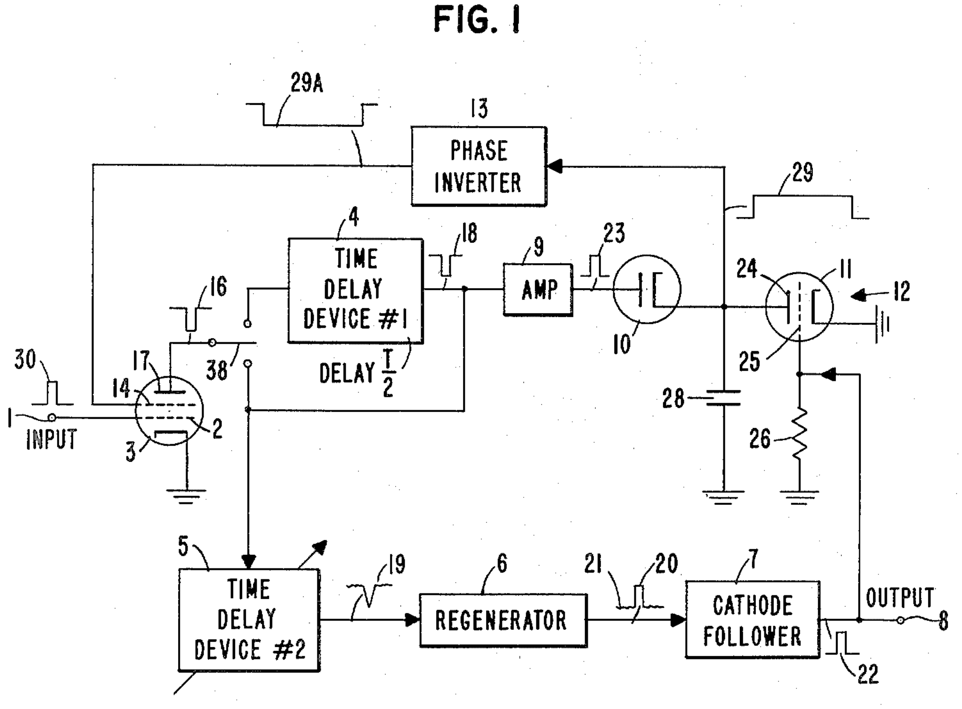
Figure 2:
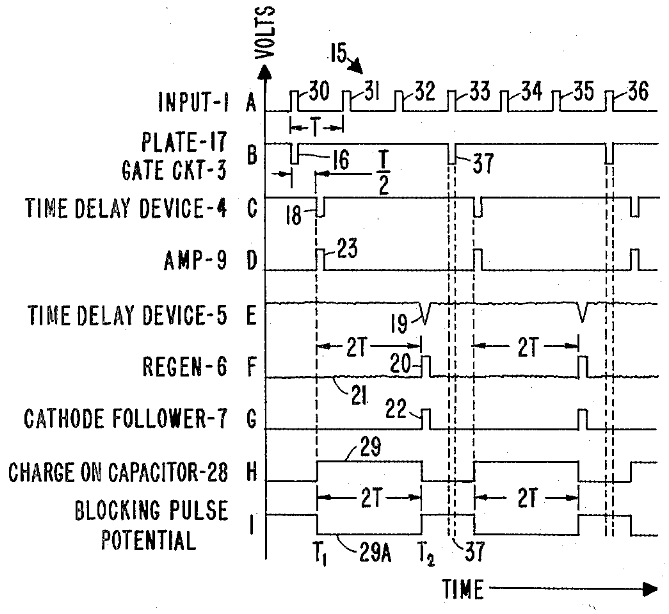

The above-mentioned and other features and objects of this invention will become more apparent by reference to the following description taken in conjunction with the accompanying drawings, in which:

Fig. 1 is a schematic circuit diagram partly in block form of a frequency divider according to this invention; and Fig. 2 shows waveform sequences useful in explaining the circuit shown in Fig. 1.

Referring to Fig. 1, input pulses of a given repetition frequency to be divided are impressed over terminal 1 on control grid 2 of a gate tube 3, the output of which is coupled to a first time delay circuit 4 and then to a second time delay circuit 5, the output of which is reshaped by means of a regeneration circuit 6. To remove jiggles due to the delay lines, the reshaped pulses are applied to a cathode follower 7, which is provided with an output terminal 8.

The output terminal of time delay circuit 4 is also connected to an amplifier 9 which is in turn coupled through a diode 10 to the plate of a triode 11 of a blocking pulse generator 12. The grid of tube 11 is connected to the cathode follower 7. This produces a stretched pulse compared to the duration of the activating input pulse. This "stretched" output pulse of increased pulse duration is then applied to a pulse inverter 13, to be inversed in polarity and then fed back as a gate blocking potential to the second grid 14 of the gate tube 3.

The above-mentioned apparatus, which comprises the circuit combination of this invention, are of conventional types, and their operation is well known and understood by those skilled in the art.

The frequency division will be explained now with reference to Figs. 1 and 2. The input pulses of pulse train 15 spaced by interval T, Fig. 2, curve A, are introduced at input terminal 1 and applied to the control grid 2 of the gate tube 3. The normal bias on grid 14 is such that the first input pulse applied to grid 2 causes the tube to conduct and produce pulse 16, Fig. 2, curve B, at plate 17 with reversed polarity as shown. Thereinafter, pulse 16 goes through the time delay circuit 4, whose time delay is here selected equal to $$\frac{T}{2}$$

A pulse 18 at the time shown in Fig. 2, curve C, will next appear at the output of the time delay circuit 4. This pulse is then fed through another time delay circuit 5, whose time delay in this example is equal to 2T. The output pulse 19 of delay circuit 5 thus appears at the time shown in Fig. 2, curve E.

The shape of pulse 19 may now be improved, if desired, by a shaping triode of the regeneration circuit 6, the output pulse 20 of which may be represented substantially as shown in curve F, Fig. 2.

The cathode follower 7 is biased to clip the baseline, thereby removing any jiggles 21 that may be caused by the delay circuit 5. The output pulse 22 of cathode follower 7 is shown in Fig. 2, curve G.

The output 18 of delay circuit 4 is also amplified and reversed in polarity by the amplifier 9 as shown at 23, curve D. This pulse is then applied through the diode 10 to the anode 24 of the vacuum triode 11 of the blocking pulse generator 12, and the pulse 22 of waveform G is applied to the grid 25 of the same triode 11. A capacitor 28, connected to the anode 24 of the tube 11 is charged by pulses 23 of the amplifier 9, thus producing a leading portion of a "stretched" pulse 29, and discharge by pulses 22 of the cathode follower 7, whereby the "stretched" pulse is terminated. The "stretched" output pulse 29 is shown at curve H. When applied to the phase inverter 13, this pulse 29 is reversed in polarity as shown at **29*a* curve I. The pulse 29*a* is fed to the grid 14 of the gate tube 3 as a gate blocking potential. Since the output will only appear at the gate tube plate 17 in response to an input pulse on grid 2 when this blocking potential is removed from grid 14, the gate tube 3 will be rendered inoperative between points $T_1$ and $T_2$, curve I. Pulses 31 and 32 of the input pulse train occur during this interval and thus fail to activate gate tube 3. At time T2, the gate tube 3 is rendered operative by termination of pulse 29*a*, and the fourth pulse 33 will appear as pulse 37** in the gate tube output circuit, curve B, Fig. 2. Thereinafter, the cycle repeats dividing the input frequency by three.

By varying the delay characteristics of device 5, division by any number is possible, within certain limits of course. The upper frequency limit is determined by bandwidth of the circuit involved. The lower frequency limit is set by the practical time delay obtainable from time delay circuit available. If there is sufficient delay in the various amplifiers and clippers so that point T1 occurs after the first pulse 30 has terminated, the delay circuit 4 may be eliminated. This elimination may be done by changing the position of switch 38. If T is the period of the input pulses applied to the gate tube 3 and $n$ the desired division ratio, the required time delay for the time delay circuit 5 is $(n-1)T$.

While we have described above the principles of our invention in connection with specific apparatus, it is to be clearly understood that this description is made by way of example only and not as a limitation to the scope of our invention as set forth in the objects thereof and in the accompanying claims.

We claim:

1. A frequency divider comprising an electron discharge device normally responsive to input pulses, means to generate a blocking pulse potential in response to conduction of said discharge device, a first signal path to apply the output of said discharge device to said blocking pulse generating means to initiate the generation of a blocking pulse, a second signal path including a delay device coupled to the output of said discharge device to apply the output of said discharge device to said blocking pulse generating means to terminate said blocking pulse, and means to apply said blocking pulse to said discharge device to render it non-responsive to input pulses for the duration of said blocking pulse.

2. A frequency divider according to claim 1, wherein the means for generating said blocking pulse potential includes a capacitor, unidirectional means for applying the signal of said first path to said capacitor to charge said capacitor, and means responsive to the delayed signal of said second path to discharge said capacitor.

3. A frequency divider according to claim 2, wherein said second path includes means for reshaping the output pulse of said delay device to remove transient effects produced by said delay device.

4. A frequency divider comprising an electron discharge device having an anode, a cathode, and at least two grid electrodes, a source of periodic voltage of frequency to be divided applied to one of said grids, a time delay device connected to the anode of said discharge device for producing a delayed output pulse, means for generating a blocking pulse potential for application to the other grid of said discharge device to control its response to said periodic voltage, a signal path coupled to the anode of said discharge device to couple the output thereof to said blocking pulse generating means to initiate generation of said blocking pulse, means to apply said delayed output pulse to said blocking pulse generating means to terminate said blocking pulse, and means to apply said blocking pulses to said other grid.

5. A frequency divider according to claim 4, wherein said blocking pulse generating means comprises a capacitor, unidirectional means to apply an output pulse of said discharge device on said signal path to charge said capacitor, and means responsive to the delayed output pulse to discharge said capacitor.

6. A frequency divider according to claim 1, wherein said time delay device includes means for modifying the shape of said delayed pulse.

7. A frequency divider according to claim 6, wherein said pulse modifying means includes a cathode follower to clip the base line of said delayed output pulse.

8. A frequency divider comprising an electron discharge device having an anode, a cathode, and at least two grid electrodes, a source of periodic voltage of frequency to be divided applied to one of said grids, two time delay devices the first of said time delay devices being connected between the output of said discharge device and the input of the second time delay device for producing a delayed output pulse, means for generating a blocking pulse potential for application to the grid of said discharge device to control its response to said periodic voltage, means to couple the output of said first time delay device to said blocking pulse generating means to initiate the generation of said blocking pulses, means to apply output of said second time delay device to said blocking pulse generating means to terminate said blocking pulse, and means to apply said blocking pulse to said other grid.

9. A frequency divider according to claim 8, wherein said first time delay device has a delay characteristic equal substantially to a half period of the input pulses to said discharge device.

10. A frequency divider according to claim 8, wherein said second time delay device has a delay characteristic equal substantially to a selected number of periods of the input pulses to said discharge device.

References Cited in the file of this patent

UNITED STATES PATENTS

| | | |
|---|---|---|
| 2,421,018 | De Rosa | May 27, 1947 |
| 2,568,319 | Christensen | Sept. 18, 1951 |
| 2,613,318 | Snyder | Oct. 7, 1952 |